Patented Jan. 16, 1940

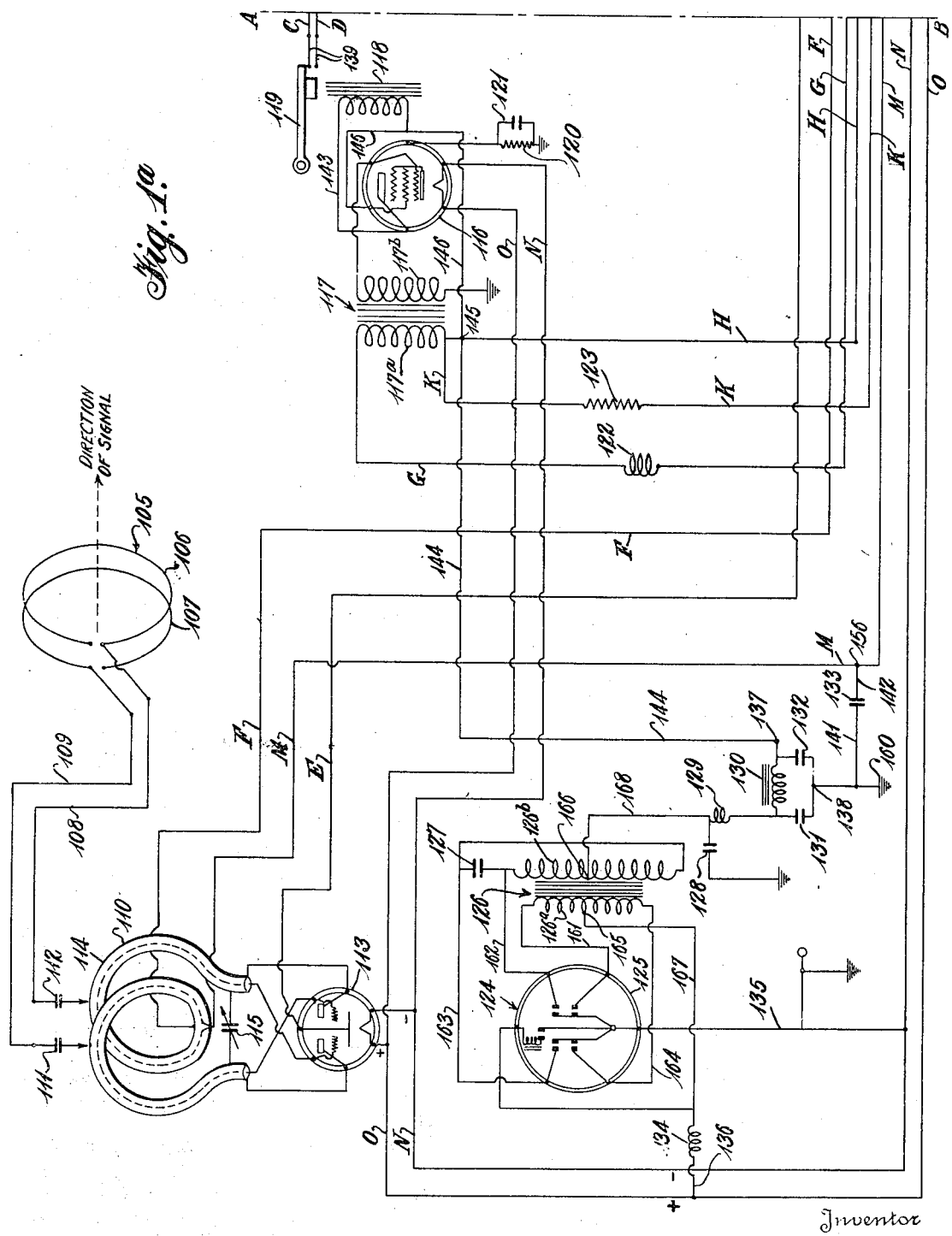

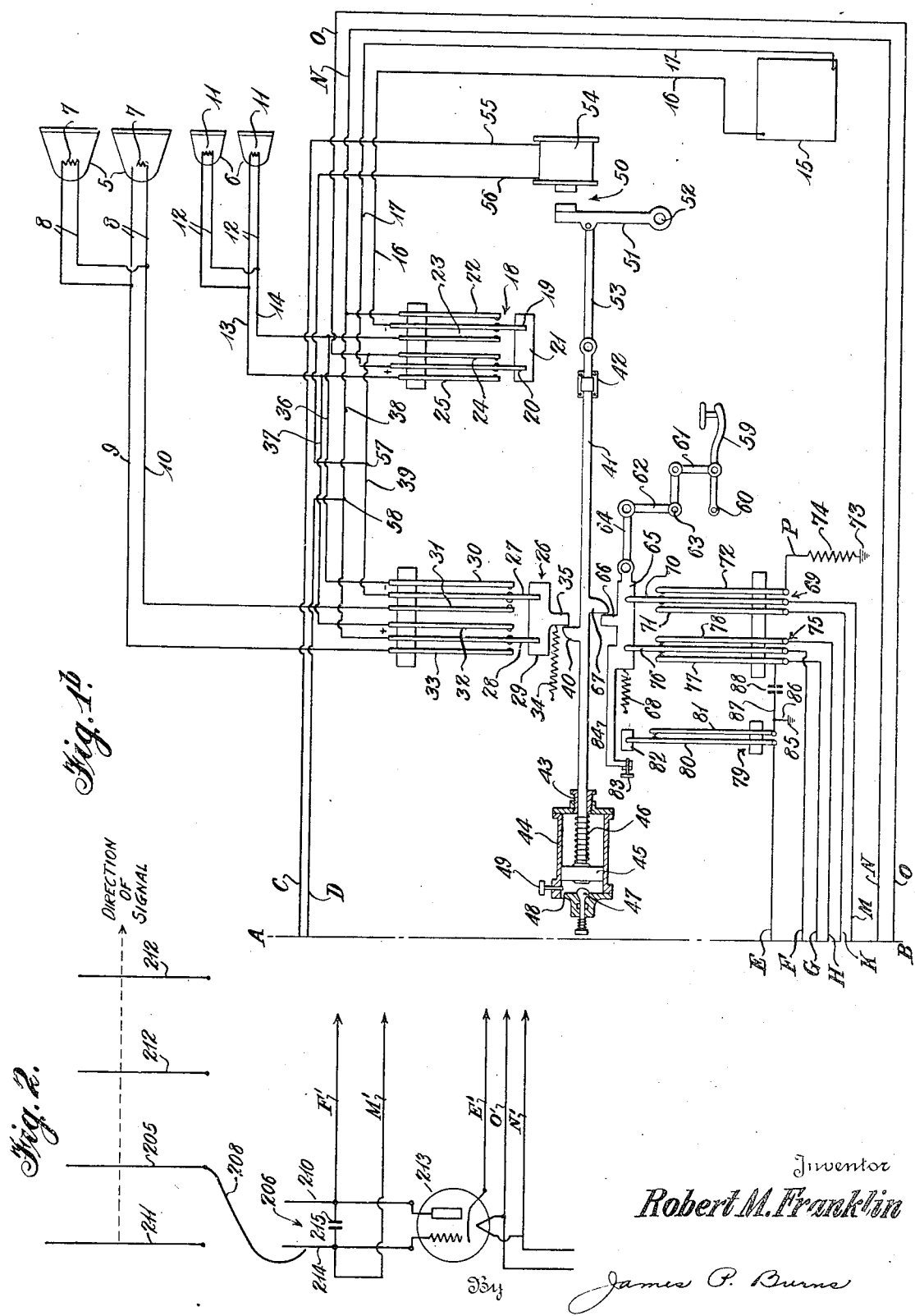

2,187,648

UNITED STATES PATENT OFFICE 2,187,648

MOTOR VEHICLE HEADLIGHT CONTROL SYSTEM

Robert M. Franklin, Brooklyn, N. Y., assignor of one-third to Eugene C. Pomeroy, Hopewell, N. J., and one-third to Royal C. Johnson, Washington, D. C.

Application May 19, 1938, Serial No. 208,902

10 Claims. (Cl. 171—97)

This invention relates to new and useful improvements in motor vehicle headlight control systems.

The primary object of the invention is to eliminate from night driving the hazard caused by the use of blinding motor vehicle headlights and to accomplish this very desirable result by the use of standardized equipment to be installed on all vehicles whereby each motor vehicle operator will have under his optional control the bright headlights of his own and all vehicles approaching from the opposite direction and which are located within a certain distance of each other so that if desired said operator may dim his own and the approaching vehicle headlights by manipulation of a single control device.

A further important object of the invention is to provide as a part of the aforementioned equipment means for automatically re-establishing the circuits for the bright headlights of the vehicles which were affected by the manipulation of said single control device after the lapse of a predetermined time interval which should be of sufficient duration to enable the affected vehicles to pass each other if they are being operated in a normal manner.

A still further object of the invention is to provide a vehicle headlight control system of the above-mentioned type in which the remote control of the headlights of approaching vehicles is obtained by the use of radio transceivers operating on ultra high frequencies and employing directional antennae.

Other objects and advantages of the invention will be apparent during the course of the following description.

In the accompanying drawings forming a part of this specification and in which like numerals are employed to designate like parts throughout the same, Figs. 1a and 1b collectively illustrate diagrammatically the wiring diagram and the equipment employed for accomplishing the aforementioned control of motor vehicle headlights, and Fig. 2 is a detail diagrammatic view of a modification of a portion of the transceiver circuit and antenna arrangement of Fig. 1a.

In the drawings, wherein for the purpose of illustration are shown the preferred embodiments of this invention, there is illustrated in Figs. 1a and 1b, the complete wiring diagram for the headlights of a vehicle, the electric circuits for these headlights, the switch mechanism which is employed for effecting variations in the circuit connections for the headlights whereby bright and dim headlights may be provided, the wiring diagram of a radio transceiver with its directional antenna which is employed as a part of the control system for the headlights and mechanical and electrical control devices for governing the operation of the radio transceiver mechanism. As Fig. 1b discloses the headlights and all of the mechanism which controls the operations of these headlights, the disclosure of this figure first will be described in detail. The description then will proceed with an explanation of the instrumentalities of the radio transceiver device and the manner in which this unit is combined with the elements disclosed in Fig. 1a.

Referring now to Fig. 1b, the reference character 5 designates a pair of large motor vehicle headlights, while the reference character 6 designates a pair of small motor vehicle headlights. These two pairs of lights are intended to be representative of the bright and dim headlights of a motor vehicle. It is appreciated that the so-called bright and dim headlights or the headlights intended to be employed respectively for country and city driving do not consist of two independent pairs of lights in present-day motor vehicles. The headlight equipment of present-day motor vehicles consists of just two headlights with either a bright and a dim bulb in each headlight, a single bulb in each headlight which is provided with bright and dim filaments, or a single filament bulb in each headlight which is caused to produce the two different types of driving lights as a result of focusing the bulb and reflector relative to each other. It is to be understood, therefore, that the two pairs of lights 5 and 6 are intended to represent the aforementioned variations in headlight equipment of motor vehicles and that wherever the expression "bright and dim headlights," or any other similar expression is employed in the specification and/or claims, such expression is intended to cover and include the aforementioned modifications or variations.

Each of the headlights 5 is provided with a filament 7 which is connected to circuit wires 8. The circuit wires 8 for both of the headlight filaments 7 merge into two common wires 9 and 10. The two dim headlights 6 are each provided with a filament 11 which is connected to a pair of wires 12. These two pairs of wires 12 merge into two common wires 13 and 14. A storage battery 15, preferably of the six-volt type, is provided for the purpose of supplying current to the said headlights. This battery is provided with wires 16 and 17.

The conventional headlight equipment of a motor vehicle includes a switch device which is operable either to turn off the headlights, to turn on the bright lights, or to turn on the dim lights. This conventional switch device is designated in its entirety in this disclosure by means of the reference character 18. This switch 18 functions in the manner of a double pole, double throw switch and includes the movable switch blades 19 and 20 which are connected by a manipulating handle, or the like, 21 for simultaneous operation. The switch blade 19 has positioned on opposite sides of the same the stationary contact blades 22 and 23. The movable switch blade 20 has associated with opposite sides of the same the stationary contact blades 24 and 25. It will be appreciated, therefore, that when the connector device 21 is moved to the right, its blades 19 and 20 will contact with the stationary blades 22 and 24 while movement of the actuating element 21 to the left will cause its blades 19 and 20 to contact the stationary blades 23 and 24.

To permit the conventional headlight equipment of a modern-day motor vehicle to be controlled by the remote control mechanism disclosed in Fig. 1a; i. e., the radio transceiver device, without dispensing with the desired manual control of the vehicle headlights by means of the usual switch, a second switch device is provided and is designated in its entirety by the reference character 26. This auxiliary switch device 26 includes the two movable switch blades 27 and 28 which are connected for simultaneous operation by means of the actuating head 29. The movable blade 27 of this switch 26 has associated with opposite sides of the same the two stationary contact blades 30 and 31. The movable blade 28 has associated with opposite sides of the same the two stationary contact blades 32 and 33. A spring 34 is connected at one end to a suitable fixed support and at its other end to an actuating finger 35 carried by the operating head 29. This spring 34 normally functions to position the two movable blades 27 and 28 in contact with the stationary blades 31 and 33.

Before tracing out the circuits which may be established between the storage battery 15 and the two pairs of headlights 5 and 6, it is believed to be advisable to explain the intended mode of operation of the two switch devices 18 and 26. The switch device 18 is entirely manually controlled. When the actuating element 21 is in the position illustrated in this figure, the bright and dim headlights 5 and 6, respectively, are turned off. When the actuating element 21 is moved to the left, the dim lights 6 are to be placed in circuit with the battery 15. When the actuating element 21 is moved to the right, the bright headlights 5 are to be placed in circuit with the battery 15. The switch device 26 is only capable of accomplishing control over the bright and dim headlights 5 and 6, respectively, when the actuating element 21 of the manual switch device 18 is shifted to the right or in the position in which it closes the circuit for the bright headlights 5. For that reason, the secondary switch device 26 receives its supply of current through the switch device 18. When the actuating element 21 of the switch device 18 is moved to the left, the dim headlights 6 are energized and no current can flow to the secondary switch device 26. This secondary switch device is normally conditioned by the spring 34 so that when the actuating element 21 of the manual switch 18 is moved to the right, the current supplied to the bright headlights 5 passes through the normally, electrically connected blades 27—31 and 28—33. As the current is supplied by the manual switch device 18 to the movable switch blades 27 and 28 of the switch device 26, these movable blades may be moved into engagement with the fixed contacts 30 and 32 for switching the current supply to the dim headlights 6 from the bright headlights 5. When the actuating head 29 of the switch device 26 is returned to its normal position, the current flows to the headlights 5 again and the dim headlights 6 are then turned off. It will be appreciated, therefore, that the manual switch device 18 may be actuated to turn on either the bright or the dim headlights and that when the bright headlights are turned on by the switch 18, the secondary switch 26 may be actuated to turn off the bright headlights and turn on the dim lights.

With this explanation, we will proceed with a description of the wiring circuits per se. It will be noted that the wires 16 and 17 which are connected to the storage battery 15 extend to and are connected with the mounted ends of the two movable switch blades 19 and 20 of the manual switch device 18. Stationary switch blade 23 of the switch device 18 is directly connected with the common wire 14 for the dim headlights 6. The stationary contact 23 of the switch device 18 is directly connected with the common wire 13 for the two dim headlights 6. Therefore, when the two movable blades 19 and 20 are moved to the left, current will flow from the battery through the wires 16 and 17, between the switch blades 19 and 23 as well as between the switch blades 20 and 25 and through the wires 13 and 14 to the dim headlight filaments 11 by way of the branch wires 12. Wire 36 extends from the common dim light wire 14 to the mounted end of the stationary blade 30 of the secondary switch device 26. The branch wire 37 extends from the common dim headlight wire 13 to the stationary contact blade 32 of the secondary switch device 26. These two branch wires 36 and 37, therefore, place the fixed contact blades 30 and 32 of the switch device 26 in parallel relation with respect to the fixed contact devices 23 and 25 of the manual switch 18.

The stationary contact blade 22 of switch device 18 is connected by a wire 38 with the movable blade 28 of the secondary switch device 26. The stationary switch blade 24 of switch device 18 is connected by a wire 39 with the movable switch blade 27 of the secondary switch device 26. It will be seen, therefore, that when the movable blades 19 and 20 of the manual switch device 18 are moved into contact with the stationary blades 22 and 24, the battery supply wires 16 and 17 will be connected with the movable switch blades 27 and 28 of the secondary switch device 26. The common circuit wires 9 and 10 for the filament 7 of the bright headlights 5 are directly connected to the mounted ends of the stationary contact blades 31 and 33 of the secondary switch device 26. Therefore, when current is supplied to the movable contact blades 27 and 28 through the wires 38 and 39, the bright headlights 5 will be energized unless the operating head 26 is moved out of its normal position. With battery current supplied to the movable blades 27 and 28 of the secondary switch device 26, these blades may be moved to the right into contact with the stationary blades 30 and 32 for breaking the circuit to the bright headlight filaments 7 and for establishing current flow through the filaments 11 of the dim headlights 6.

There now will be developed the mechanism employed for actuating the secondary switch 26 in a manner to accomplish the objects of the invention. The actuating finger 35 of the head 29 is located in the path of movement of the abutment 40 of the rod 41 which is mounted for truly rectilinear movement by means of the bearing 42 and the stuffing box 43 of the stationary cylinder 44. It is intended that this reciprocating rod 41 be capable of partaking of rapid movement to the right and slow or delayed movement to the left. The mechanism employed for effecting the rapid movement to the right will be described at a later point. The slow or retarded movement to the left occurs automatically in sequence to a movement to the right. To bring about this retarded movement to the left, the rod 41 has mounted on its left-hand end a piston 45 which is positioned within the cylinder 44. A spring 46 loads the piston 45 for movement to the left through the bore of the cylinder 44. When the rod 41 and its piston 45 are moved to the right, the spring loaded inlet valve 47 permits air to rapidly enter the cylinder 44 behind the piston 45. When the power employed for moving the rod 41 to the right has been stopped or shut off, the spring 46 functions to move the piston 45 to the left. The air drawn into the cylinder in back of the piston is forced to leave the cylinder through the air vent or bleeder hole 48 which is controlled by means of the needle valve 49. Adjustment of this needle valve, therefore, will regulate the rate of movement of the piston 45 to the left in the cylinder 44. This piston, cylinder and valve arrangement, therefore, acts as a dashpot or delay mechanism for the reciprocating rod 41.

Two devices are provided for supplying the power required to move the reciprocating rod 41 to the right. It will be appreciated that when this rod does move to the right, its abutment 40 will engage the actuating finger 35 of the head 29 employed for operating the secondary switch 26 so that right-hand movement of the said reciprocating rod will actuate the switch blades 27 and 28 to separate them from the contacts 31 and 32 which control the circuit for the bright headlights 5 and to move these blades 27 and 28 into engagement with the stationary blades 30 and 32 for closing the circuit to the filaments of the dim headlights 6.

One source of power for moving the reciprocating rod 41 to the right consists of a relay which is designated in its entirety by the reference character 50. This relay includes an armature arm 51 which is pivoted at 52 to any suitable fixed support and is connected to the outer end of the reciprocating rod 41 by means of the link 53. The armature 51 is moved in a clockwise direction around its pivot 52 by energization of the electro-magnet 54. The two leads or terminals of this magnet are connected to the wires 55 and 56. The wire 55 extends to the section line A—B which denotes the line on which Figs. 1a and 1b are joined. At this section line A—B, the wire 55 is designated by the reference character C. The remaining electro-magnet wire 56 extends to and is connected with the previously referred to wire 39 at the point 57. It will be remembered that this wire 39 acts as one of the current supply wires for the secondary switch 26 when the actuating element 21 of the manual switch 18 is moved to the right to establish the circuit for the bright headlights 5. The remaining supply wire 38, extending between the two switch devices 18 and 26, has connected to the same, as at 58, the wire D which extends to the section line A—B referred to above. It will be seen, therefore, that when the actuating element 21 of the manual switch 18 is moved to the right to turn on the bright headlights 5, through the medium of the secondary switch 26, the wires 55—C and 56—D are placed in circuit with current supply lines 38 and 39. However, current will not flow through the electro-magnet 54 because of the gap or break between the wires C and D. The bridging of these two last-mentioned wires is necessary to effect energization of this electro-magnet 54. It will be explained while describing the radio transceiver disclosed in Fig. 1a, that the bridging of these wires C and D will be accomplished as a result of the reception of a radio impulse by the transceiver. Therefore, when a radio impulse is received by the transceiver, the electro-magnet 54 will be energized and will attract its armature 51. Movement of the armature will pull the rod 41 to the right and will bring about movement of the operating head 29 for the secondary switch 26 to break the current supply to the filaments 7 of the bright headlights 5 and to make or close the circuit to the filaments 11 of the dim headlights 6. When reception of the radio impulse ceases, the circuit to the electro-magnet 54 will be broken and this magnet will be de-energized. The spring 46, bearing against the piston 45, then will function to move the said piston and the rod 41 to the left at the rate of movement permitted by the discharge of air through the vent or bleed opening 48. This slow return movement of the rod 41 will delay the return movement of the operating head 29 for the secondary switch 26 and will maintain the dim headlights 6 energized during the period of delay. When the rod 41 finally returns to its normal position, the circuit to the dim headlights will be broken and the circuit to the bright headlights will be re-established. The reception of a radio impulse by the transceiver, therefore, automatically effects a change from the bright headlights to the dim headlights and, after the elapse of a definite time interval, the re-energization of the bright headlights and a discontinuation of the dim headlights.

The second means employed for moving the rod 41 to the right consists of a manually operable level or key 59 which is pivoted at 60 and is connected by a link 61 to one branch or arm of a bell crank lever 62 pivoted at 63. The remaining branch or arm of this bell crank lever is connected by a link 64 to a slide 65 which is provided with an abutment 66 adapted to engage a finger 67 formed on the rod 41. By depressing the free end of the lever or key 59, the link and lever mechanism and the slide 65 will accomplish movement of the rod 41 to the right. When the lever or key 59 is released, a spring 68 will function to return this mechanism to its normal starting position.

It will be better understood after the description of Fig. 1a is presented, that the radio transceiver normally is conditioned to receive an impulse transmitted by a transceiver located on another motor vehicle which is located in a proper relation with respect to the transceiver of the instant vehicle. Therefore, when the bright headlights of the instant vehicle are energized, the operator of another vehicle equipped with the device embodying this invention may send out a radio impulse which will cause energization of the magnet 54 on the first mentioned vehicle for automatically changing from the bright to the dim headlights of that vehicle.

Let us now assume that the operator of the vehicle equipped with the particular apparatus disclosed in the drawings is desirous of transmitting a radio impulse which will dim the headlights of vehicles approaching from the opposite direction. The said operator, also, should dim his own headlights. It has been explained how actuation of the lever or key 59 will dim the headlights of the vehicle provided with the actuated key or lever.

Three switch devices are provided and are actuated by the slide 65 for effecting proper control over the transceiver. One of these switches is designated by the reference character 69 and includes a movable switch blade 70 which is connected to the slide 65 at its free end. This movable blade 70 normally contacts the stationary switch blade 71, but is movable into engagement with the stationary blade 72. The normal position of the switch blade 70, therefore, electrically connects the two wires K and M which extend to the aforementioned section line A and B. When the switch blade 70 is moved to the right, as a result of actuation of the lever or key 59, an electrical connection is made between the blade 70 and the contact blade 72. This electrical connection closes the normally open gap between the wire M and the wire P which extends to a ground 73 through a 10,000 ohm resistance 74.

The second switch, designated by the reference character 75, has a movable contact blade 76 which is connected at its free end to the slide 65 and which normally contacts with a stationary switch blade 77. Movement of the switch blade 76 to the right places it in electrical contact with a second stationary blade 78. When the movable switch blade 76 is in its normal position, engagement of the blades 76 and 77 results in electrically connecting the wires F and G which extend to the section line A and B. When the switch blade 76 is moved to the right into engagement with the stationary blade 78, the gap is closed between wires F and H which extend to the section line A and B.

The third switch, designated in its entirety by the reference character 79, includes a movable blade 80 and a fixed blade 81. These two blades normally are out of contact with each other. The free end of the movable blade 80 is provided with a head 82 which is to be engaged by an adjustable screw 83 carried by the extension 84 of the slide 65. It will be noted that the mounted end of the switch blade 80 is connected to the wire E which extends to the section line A—B. The fixed or stationary switch blade 81 is connected to a ground 85 by the wire 86. This ground also is connected to the blade 77 of the switch 75 by the wire 87 which has interposed therein a fixed condenser 88 which has a capacity of .004 mfd.

The switches 69 and 75 with their blades 70—71 and 76—77 normally in contact with each other, function to condition the transceiver as a receiver in readiness to pick up a radio impulse which will actuate the electro-magnet 54. When the lever or key 59 is depressed, the blades 70 and 76 of the switches 69 and 75, respectively, are moved to the right into engagement with the blades 72 and 78, respectively. These new positions of the blades 70 and 76 close new circuits for the transceiver and result in conditioning the same as a transmitter. With the transceiver thus conditioned as a transmitter, movement of the blade 80 into contact with the blade 81 results in actuation of the transceiver to send out a radio impulse or signal.

The storage battery 15 is not only to be used as the source of current supply for the headlights 5 and 6, but is also to act as the A battery for the transceiver. The wires N and O, therefore, extend from the section line A—B up to the switch device 18 where the wire N is connected to the wire 38 while the wire O is connected to the wire 39. It will be remembered that these two wires 38 and 39 function as supply wires extending from the manual switch device 18 to the secondary switch device 26 when the manual switch device is actuated to turn on the bright headlights.

Referring now to Fig. 1a, which shows a wiring diagram of the radio transceiver with its directional antenna, the reference character 105 designates a directional antenna employed for the reception of incoming signals or for the transmission of radio impulses. The antenna 105 is of convenient form for ultra high frequencies of the order of 56 megacycles and higher and consists of two half wave loops 106 and 107 coupled to the plate coil 110 of the transceiver by means of a 600 ohm transmission line formed by the feeders 108 and 109, and the condensers 111 and 112, each of which have a capacity of .002 mfd.

For a 56 megacycle transceiver, the half wave loops 106 and 107 of the directional antenna 105 are each approximately 8 feet in length and are spaced approximately 5 inches apart. The two ends of each half wave loop are brought within approximately one inch of each other. For maximum directional control of signals, the feeders 108 and 109 are connected at alternate ends of the half wave loops 106 and 107 in order that the two loops will be out of phase with each other.

A loop antenna such as that described for operation on 56 megacycles will approximate 30 inches in diameter. Its location upon a motor vehicle preferably should be such that the transmitted signal is directed toward the oncoming vehicle without interference by any part of the vehicle upon which it is mounted.

The transceiver portion of the headlight control device is primarily of three integral parts; namely, the oscillator, the amplifier, and the power supply.

The oscillator consists of a #6E6 vacuum tube 113, an oscillator tank coil 110, an oscillator grid coil 114, enclosed within the tank coil, and a variable 15 mfd. tuning condenser 115. The plate coil 110 is made of two turns of $\frac{3}{8}$" copper tubing. The grid coil 114 is a length of well insulated #18 copper wire drawn through the copper tubing that forms the plate coil. This grid coil 114 is tapped at the exact center and the wire M is brought out through a hole in the center of the tubing.

The amplifier portion of the transceiver consists of a #41 vacuum tube 116, a coupling transformer 117, which may be a three-to-one ratio audio transformer, a relay coil 118, a relay armature 119, a grid leak resistance 120, preferably of 500 ohms and 5 watts, a grid leak condenser 121 of 5 mfd., a radio frequency choke 122 of 125 mh., and a 400,000 ohm one-half watt resistance 123. The power supply is preferably of the full wave synchronous type and consists of a vibrator power unit 124 enclosed within a shielding can 125 which is connected through lines 161 and 162 to the opposite ends of primary coil 126a, and through lines 163 and 164 to the opposite ends of secondary coil 126b. Coils 126a and 126b make up power transformer 126 and are center tapped at points 165 and 166 respectively, by wires 167 and 168. Other components of the power supply consist of two .01 mfd. condensers 127 and 128, two 2 mh. radio frequency chokes 129 and 134, a 15 henry choke 130, a 4 mfd. filter condenser 131 and an 8 mfd. filter condenser 132.

The integral parts of the transceiver having been identified, its operation will next be described.

When the switch 21 has been thrown to the right, thus establishing contact between the blades 18 and 20 with the blades 22 and 24, the wires N and O are energized from the battery 15. This energy is carried by the wires N and O to the vibrator power unit 124 of the power supply by means of the branch wires 135 and 136. By means of the vibrator power unit 124, the power transformer 126, and the filter supply, represented by the components numbered 128 to 132, this current is thereby converted to a B supply of the order of 135 volts. Thus, the terminals 137 and 138 represent the B plus and B minus outlets, respectively, of the power supply unit. The B minus outlet is grounded at 160, while the B plus connection is made with B plus terminal 145 of the transceiver through line 144.

In addition to supplying "A" voltage for the power supply, lines N and O additionally furnish the filament current for the tubes 113 and 116.

As has been pointed out, when the switch 21 is thrown to the right, the normal position of the switches 69 and 75 maintain the transceiver in a receiving condition. This is accomplished by switch blade 70, contacting switch blade 71 thus connecting the wires K and M, and switch blade 76 contacting switch blade 77 thus connecting the wires F and G.

From Fig. 1a, it will be seen that in the normal receive position; i. e., with wires K and M connected through switch 69, the grid coil 114 of the oscillator is connected through lines M and K and through the resistance 123 to the B plus terminal 145. It will also be seen that in the receive position, lines F and G are connected through switch 75 thus permitting the plate current for the oscillator tube 113 to flow through the primary of transformer 117. When switches 69 and 75 are thrown to the transmit positions, the grid coil 114 of the oscillator is connected to ground 73 through line M, switch 69 and through resistance 74, while the plate coil 110 of the oscillator is directly connected to the B plus supply terminal 145, lines F and H, and switch 75. The grid coil 114 is by-passed to ground by means of a .0005 mfd. condenser 133 connected to line M by wire 142 and connected to ground 160 by wire 141.

From B plus terminal 137, the power supply current flows by means of line 144 to the terminal 145. From this terminal, B plus current reaches the screen grid of tube 116 through line 146. Additionally, B plus current flows to the plate coil 110 of the oscillator, from terminal 145 by means of lines G or H (depending upon whether switch 75 is in the receive or transmit position), switch 75 and line F.

With the transceiver in its normal receiving position, a signal is picked up by means of the directional antenna 105, conducted to the plate coil 110 of the oscillator circuit by means of the feeders 108 and 109, inductively coupled to the grid coil 114 of the oscillator circuit, detected by the oscillator tube 113, conveyed from the plates of that tube through plate coil 110 and wire F to switch blade 76 of switch 75; thence to switch blade 77 and through line G to the primary of the transformer 117 and to the B plus terminal 145. The signal passing through the primary 117a of transformer 117 is picked up by the secondary coil 117b of that transformer and impressed upon the grid of the amplifier tube 116. This induces a flow of current through line 143 from the plate of the amplifier tube 116 and through the winding of the relay coil 118 to the B plus terminal 145. The flow of current through the relay coil winding 118 draws the relay armature 119 to actuate switch blades 139 for bridging wires C and D, thus setting into operation the relay 50 which, through the rod 41 and switch 26, opens the circuits to the bright lights and closes the circuits to the dim lights, as hereinabove described. Accordingly, the reception of a radio impulse has been utilized to effect the switching of car lights from bright to dim, which is one of the objects of this invention.

When the operator of the vehicle desires to dim his own lights and those of an approaching car, he may do so by pressing the key 59. In addition to thereby switching his lights from bright to dim by means of the switch 26, he places the transceiver in a transmitting condition by establishing contact between switch blades 70—72, and 76—78. Switch 69 thereby breaks the connection between lines M and K and serves to directly connect the grid coil 114 of the oscillator with ground 73 through switch blades 70—72 and resistance 74. By the shifting of switch 75 to transmit position, the plate coil 110 of the oscillator is directly connected to the B plus supply terminal 145 through line F, switch blades 76—78, and line H. In addition, the pressing of the key 59 establishes a contact between switch blades 80 and 81 of switch 79, thereby connecting the cathode of the oscillator tube 113 through line F with ground connection 85. Since the B minus outlet 138 of the power supply unit is grounded, this places the oscillator tube 113 into oscillation, thus generating a signal which is conducted from the plates of the oscillator tube 113 to the directional antenna 105 by means of the oscillator plate coil 110, the antenna condensers 111 and 112, and the antenna feeders 108 and 109. A signal is thus generated and transmitted to the approaching vehicle at the same time that the operator of the first vehicle dims his own lights. This results in the dimming of the lights of the oncoming vehicle, in the manner above described, upon the reception of a radio impulse.

Fig. 2 is illustrative of an oscillator tube and antenna system which may be employed in lieu of these components in Fig. 1a. This modification is particularly adapted for operation upon the higher ultra high frequencies such as 300 megacycles and higher. This circuit has been found most effective upon 400 megacycles, or three-fourths of a meter.

It consists of the oscillator tube 213, which is preferably a #955 acorn type radio tube, a parallel wire LC circuit 206, an antenna feeder 208, and an antenna 205. At ¾ meters, the length of each of the parallel wires 210 and 214, of the LC circuit, is approximately one inch and they each consist of a No. 14 bare copper wire soldered to the plate and grid leads, respectively, of the tube. The nature of the tube employed inherently furnishes the remainder of the capacity necessary for operation on 400 megacycles.

The antenna 205 is coupled to the parallel wire LC circuit 206 by the antenna feeder 208 which is connected to some point along the wire 214.

In order to give a directional effect to the signal radiated from the antenna 205, a reflector 211 and director 212 may be positioned about the antenna 205 in the following manner: The antenna array best suitable for operation on three-quarters meter or 400 megacycles has been found to consist of an antenna wire or rod 205 which is approximately 13¾ inches in length behind which, at a distance of approximately 7 inches, there is placed the reflector wire or rod 211 of 14¼ inches in length, and in front of which there is placed one or more director wires or rods 212 of 13 inches in length. The first director 212 is properly positioned about 10½ inches forward of the antenna 205 while one or more additional directors 212 may be positioned each 10½ inches forward of the last director. By the use of directors and reflectors, there is obtained a maximum control of the direction of signal thereby effecting a concentration of the signal in the direction of the oncoming vehicle and avoiding the operation of similar equipment upon vehicles approaching from other directions, the lights of which do not interfere and accordingly need not be dimmed.

The connections of the oscillator tube 213 of Fig. 2 with the remainder of the transceiver circuit follows in general the connections of the oscillator tube 113 of Fig. 1a. The filament supply is furnished from the "A" battery 15 by lines N' and O' corresponding with lines N and O of Fig. 1a.

The cathode of the oscillator tube 213 is connected to switch point 80 of switch 79 by line E' and thus to ground 85, corresponding to line E of Fig. 1a, when switch 79 is placed in the transmit position. The grid of the oscillator tube 213 is connected to the grid side of condenser 215 through wire 214 and is additionally connected to switch blade 70 of switch 69 by means of line M', corresponding to line M of Fig. 1a. Condenser 215 is a .001 mfd. condenser. Thus when switch 69 is in its normal receive positon, the grid of the oscillator 213 is connected through line M', switch blades 70 and 71, line K and resistance 123 with the B plus terminal 145. When switch 69 is in the transmit position, the grid of the oscillator 213 is connected to the B minus or ground 73 by means of line M, switch blades 70 and 72, and resistance 74.

The plate of the oscillator 213 is connected with the plate side of the condenser 215 and is additionally connected by means of line F' with blade 76 of the switch 75. When this switch is in the transmit position; that is, with contact between switch blades 76 and 78, B plus current flows directly from the B plus terminal 145 through line H, through the switch 75 and by line F' to the plate of the oscillator 213. When switch 75 is in a receive position, B plus current flows from terminal 145 through the primary coil of transformer 117, thence through line G, radio frequency choke 122, switch contact points 77 and 76, to line F' and to the plate of the oscillator tube 213.

Although there have been shown several modifications of antenna arrays and oscillator circuits, it should be understood that these are illustrative only of the many modifications that might be employed to operate the headlight control device. It may not be necessary to utilize reflectors or directors if some suitable means is employed to dampen or shield the signal to the rear of the antenna and permit a clear radiating field forward, since the range of signal need not be concentrated providing it is of sufficient strength to operate the control device on an oncoming vehicle when that vehicle is within the distance where its lights are blinding to the operator of the first oncoming vehicle. Accordingly, a properly grounded shield so arranged as to dampen the radiation of signals in all directions except the forward direction might be found entirely satisfactory in place of the directive arrays shown in Figs. 1a and 2.

It is to be understood that the forms of the invention herewith shown and described are to be taken as preferred examples of the invention and that various changes in the shape, size, and arrangement of parts may be resorted to without departing from the spirit of the invention or the scope of the subjoined claims.

Having thus described the invention, I claim:

1. In a motor vehicle headlight control system of the type described, the combination with headlight apparatus on approaching vehicles which are operable to produce bright and dim light conditions and which include electrical circuits for establishing said different conditions, of mechanism on each vehicle including switching means for controlling said circuits, a device for transmitting and receiving, under directional control, energy impulses of a given wave length and which is normally conditioned as a receiver, manual means operable to actuate said switching means to dim the headlights and simultaneously convert the said device to a transmitter and transmit an energy impulse, means operable in response to the reception of an energy impulse by said device for actuating said switching means to dim the headlights, and means for effecting a delayed actuation of said switching means to re-establish the bright lights after dimming of the same as a result of operation of either the manual means or the impulse operating means, whereby the manipulation of the manual means on one vehicle will result in dimming of the headlights of that vehicle and of the vehicles approaching from the opposite direction and located within the range of the transmitting device for said first vehicle.

2. In a motor vehicle headlight control system of the type described, the combination with the bright and dim headlights of approaching vehicles and electric circuits on each vehicle for said bright and dim lights including a source of electricity and a manual headlight control switch, of a second switch on each vehicle connected in the light circuits and operable, when the manual headlight switch is set to energize the bright headlights, to control said circuits to energize either the bright or dim headlights, operating means for said second switch, means operatively connected to said second switch operating means for permitting rapid movement of said operating means in the direction to effect dimming of the headlights and for prolonging the return movement which re-establishes the bright headlights, manually operable means for actuating said second switch operating means to move it in its direction of rapid movement, a device on each vehicle for transmitting and receiving, under directional control, energy impulses of a given wave length, means on each vehicle actuated by the manually operable means to cause its said device to transmit an energy impulse, and means on each vehicle for actuating said second switch operating means in its direction of rapid movement in response to reception by its said device of an energy impulse transmitted by the device of an approaching vehicle, whereby the manipulation of the manually operable means on one vehicle will result in dimming of the headlights of that vehicle and the headlights of the vehicles approaching from the opposite direction and located within the range of the transmitting device for said first vehicle.

3. In a motor vehicle headlight control system of the type described, the combination with headlight apparatus on approaching vehicles which are operable to produce bright and dim lighting conditions and which include electrical circuits for establishing said different conditions, of mechanism on each vehicle including switching means for controlling said circuits, a radio transceiver operable on an ultra high frequency wave length and including a directional antenna, said transceiver being normally conditioned to receive signals, manual means operable to actuate said switching means to dim the headlights and simultaneously actuate the transceiver to transmit a radio impulse, means operable in response to the reception of an energy impulse by said transceiver for actuating said switching means to dim the headlights, and means for effecting a delayed actuation of said switching means to re-establish the bright lights after dimming of the same as a result of operation of either the manual means or the impulse operated means, whereby the manipulation of the manual means on one vehicle will result in dimming of the headlights of that vehicle and of the vehicles approaching from the opposite direction and located within the range of the transmitting device for said first vehicle.

4. In a motor vehicle headlight control system of the type described, the combination with the bright and dim headlights of approaching vehicles and electric circuits on each vehicle for said lights including a source of electricity and a manual headlight control switch, of a second switch on each vehicle connected in the light circuits and operable, when the manual headlight control switch is set to energize the bright headlights, to control said circuits to energize either the bright or dim headlights, operating means for said second switch, means operatively connected to said second switch operating means for permitting rapid movement of said operating means in the direction to effect dimming of the headlights and for prolonging the return movement which reestablishes the bright headlights, manually operable means for actuating said second switch operating means to move it in its direction of rapid movement, a radio transceiver on each vehicle operable on an ultra high frequency wave length and including a directional antenna, means on each vehicle actuated by the manually operable means to cause said transceiver to transmit a radio impulse, means on each vehicle actuated by the manually operable means to cause its transceiver to transmit a radio impulse, and means on each vehicle for actuating said second switch operating means in its direction of rapid movement in response to reception by its transceiver of an impulse transmitted by the device of an approaching vehicle, whereby the manipulation of the manually operable means on one vehicle will result in dimming of the headlights of that vehicle and the headlights of the vehicles approaching from the opposite direction and located within the range of the transmitting device for said first vehicle.

5. In a motor vehicle headlight control system of the type described, the combination with headlight apparatus on approaching vehicles which are operable to produce bright and dim lighting conditions and which include electrical circuits for establishing said different conditions, of mechanism on each vehicle including switching means for controlling said circuits, a radio transceiver operable on an ultra high frequency wave length and including a directional antenna, a switch device normally operating to condition said transceiver as a receiver but being operable to condition the same as a transmitter and to simultaneously send out a radio impulse, manual means operable to actuate the headlight switching means to dim the headlights and simultaneously actuate the switch device of the transceiver to effect sending of said impulse, means operable in response to the reception of a radio impulse by said transceiver for actuating the headlight switching means to dim the lights, and means for effecting a delayed actuation of said headlight switching means to re-establish the bright lights after dimming of the same, whereby the manipulation of the manual means on one vehicle will result in dimming of the headlights of that vehicle and of the vehicles approaching from the opposite direction and located within the range of the transmitting device for said first vehicle.

6. In a motor vehicle headlight control system of the type described, the combination with headlight apparatus on approaching vehicles which are operable to produce bright and dim lighting conditions and which include electrical circuits for establishing said different conditions, of mechanism on each vehicle including switching means for controlling said circuits, a radio transceiver operable on an ultra high frequency wave length and including a directional antenna, a switch device normally operating to condition said transceiver as a receiver but being operable to condition the same as a transmitter and to simultaneously send out a radio impulse, manual means operable to actuate the headlight switching means to dim the headlights and simultaneously actuate the switch device of the transceiver to effect sending of said impulse, a relay energized by the reception of a radio impulse by said transceiver, means actuated by the relay when energized to operate the headlight switching means to dim the lights, and means for effecting a delayed actuation of said headlight switching means to re-establish the bright lights after dimming of the same, whereby the manipulation of the manual means on one vehicle will result in dimming of the lights of that vehicle and of the vehicles approaching from the opposite direction and located within the range of the transmitting device for said first vehicle.

7. In a motor vehicle headlight control system of the type described, the combination with headlight apparatus on approaching vehicles which are operable to produce bright and dim lighting conditions and which include electrical circuits for establishing said different conditions, of mechanism on each vehicle including switching means for controlling said circuits, a radio transceiver operable on an ultra high frequency wave length and including a directional antenna, a switch device normally operating to condition said transceiver as a receiver but being operable to condition the same as a transmitter and to simultaneously send out a radio impulse, manual means operable to actuate the headlight switching means to dim the headlights and simultaneously actuate the switch device of the transceiver to effect sending of said impulse, means operable in response to the reception of a radio impulse by said transceiver for actuating the headlight switching means to dim the lights, means for automatically actuating said headlight switching means to re-establish the bright lights after dimming of the same, and control means for delaying the operation of said automatic means to prevent immediate re-establishment of said bright headlights, whereby the manipulation of the manual means on one vehicle will result in dimming of the headlights of that vehicle and of the vehicles approaching from the opposite direction and located within the range of the transmitting device for said first vehicle.

8. In a motor vehicle headlight control system of the type described, the combination with headlight apparatus on approaching vehicles which are operable to produce bright and dim lighting conditions and which include electrical circuits for establishing said different conditions, of mechanism on each vehicle including switching means for controlling said circuits, a radio transceiver operable on an ultra-high frequency wave length and including a directional antenna, a switch device normally operating to condition said transceiver as a receiver but being operable to condition the same as a transmitter and to simultaneously send out a radio impulse, manual means operable to actuate the headlight switching means to dim the headlights and simultaneously actuate the switch device of the transceiver to effect sending of said impulse, means operable in response to the reception of a radio impulse by said transceiver for actuating the headlight switching means to dim the lights, means for automatically actuating said headlight switching means to re-establish the bright lights after dimming of the same, and a dashpot device for delaying the operation of said actuating means to prevent immediate re-establishment of said bright headlights, whereby the manipulation of the manual means on one vehicle will result in dimming of the headlights of that vehicle and of the vehicles approaching from the opposite direction and located within the range of the transmitting device for said first vehicle.

9. In a motor vehicle headlight control system of the type described, the combination with a vehicle headlight apparatus which is operable to produce bright and dim lighting conditions and which includes electrical circuits for establishing said different conditions, of mechanism including switching means for controlling said circuits, a device for transmitting and receiving, under directional control, energy impulses of a given wave length and which is normally conditioned as a receiver, manual means operable to actuate said switching means to dim the headlights and simultaneously convert the said device to a transmitter and transmit an energy impulse, means operable in response to the reception of an energy impulse by said device for actuating said switching means to dim the headlights, and means for effecting a delayed actuation of said switching means to re-establish the bright lights after dimming of the same as a result of operation of either the manual means or the impulse operated means.

10. In a motor vehicle headlight control system of the type described, the combination with the vehicle headlights which are operable to produce bright and dim lighting conditions and which includes electrical circuits for establishing said different conditions, of mechanism including switching means for controlling said circuits, a radio transceiver operable on an ultra high frequency wave length and including a directional antenna, said transceiver being normally conditioned to receive signals, manual means operable to actuate said switching means to dim the headlights and simultaneously actuate the transceiver to transmit a radio impulse, means operable in response to the reception of an energy impulse by said transceiver for actuating said switching means to dim the headlights, and means for effecting a delayed actuation of said switching means to re-establish the bright lights after dimming of the same as a result of operation of either the manual means or the impulse operated means.

ROBERT M. FRANKLIN.